United States Patent
Krausz et al.

(10) Patent No.: US 6,873,464 B1
(45) Date of Patent: Mar. 29, 2005

(54) MULTILAYER MIRROR

(75) Inventors: Ferenc Krausz, Vösendorf (AT); Gabriel Florin Tempea, Vienna (AT)

(73) Assignee: Femtolasers Produktions GmbH (AT)

( * ) Notice: Subject to any disclaimer, the term of this patent is extended or adjusted under 35 U.S.C. 154(b) by 6 days.

(21) Appl. No.: 10/149,337

(22) PCT Filed: Jul. 5, 2000

(86) PCT No.: PCT/AT00/00183

§ 371 (c)(1), (2), (4) Date: Sep. 3, 2002

(87) PCT Pub. No.: WO01/42821

PCT Pub. Date: Jun. 14, 2001

(30) Foreign Application Priority Data

Dec. 9, 1999 (AT) .............................. 2066/99

(51) Int. Cl.⁷ ................................ G02B 5/28
(52) U.S. Cl. ...................... 359/584; 359/585; 359/588; 359/590
(58) Field of Search ................ 359/359, 360, 359/584, 585, 586, 588, 589, 590

(56) References Cited

U.S. PATENT DOCUMENTS

| | | | |
|---|---|---|---|
| 3,965,439 A | 6/1976 | Firester | |
| 4,969,175 A | 11/1990 | Nelson et al. | |
| 5,045,397 A | 9/1991 | Jensen | 428/429 |
| 5,734,503 A | 3/1998 | Szipocs et al. | 359/584 |
| 5,912,915 A * | 6/1999 | Reed et al. | 372/93 |
| 6,115,401 A * | 9/2000 | Scobey et al. | 372/100 |
| 6,222,673 B1 * | 4/2001 | Austin et al. | 359/584 |
| 6,256,434 B1 * | 7/2001 | Matuschek et al. | 385/37 |
| 6,282,215 B1 * | 8/2001 | Zorabedian et al. | 372/20 |

FOREIGN PATENT DOCUMENTS

| | | |
|---|---|---|
| AT | 0116099 | 6/2002 |
| DD | 3026370 | 1/1981 |
| EP | 0416105 | 3/1991 |
| EP | 0533362 | 3/1993 |
| JP | 58-042002 A * | 3/1983 |
| WO | 98/10494 | 3/1998 |
| WO | 99/60675 | 11/1999 |

OTHER PUBLICATIONS

R. Szipöcs et al., "Chirped Multilayer Coatings for Broadband Dispersion Control in Femtosecond Lasers", *Optics Letters*, Feb. 1, 1994, vol. 19, No. 3, pp. 201–203.

G. Tempea et al., "Dispersion Control Over 150 THz With Chirped Dielectric Mirrors", *IEEE Journal of Selected Topics in Quantum Electronics*, Mar./Apr. 1998, vol. 4, No. 2, pp. 193–196.

N. Matsuschek et al., "Theory of Double–Chirped Mirrors", *IEEE Journal of Selected Topics in Quantum Electronics*, Mar./Apr. 1998, vol. 4, No. 2, pp. 197–208.

R. Szipöcs et al., "Generation of 11–fs pulses from a Ti:sapphire laser without the use of prisms", *Optics Letters*, Feb. 1, 1994, vol. 19, No. 3, pp. 204–206.

* cited by examiner

Primary Examiner—John Juba, Jr.
(74) Attorney, Agent, or Firm—Ostrolenk, Faber, Gerb & Soffen, LLP

(57) ABSTRACT

A multilayer mirror (1), in particular a multilayer dispersive mirror, comprising several individual layers (2, 3) of different properties applied to a substrate (4; 14) and following each other via parallel, plane interfaces (6), and a plane front face (5; 5') on the side of beam impact which is inclined relative to the interfaces (6) between the individual layers (2, 3).

7 Claims, 5 Drawing Sheets

MULTILAYER MIRROR

BACKGROUND OF THE INVENTION

The invention relates to a multilayer mirror, in particular a dispersive multilayer mirror, comprising several individual layers of different properties applied to a substrate and following each other via parallel, plane interfaces, and a plane front face on the side of beam impact.

In laser technology, shorter laser pulses comprising pulse durations in the picosecond and femtosecond range (to less than 10 femtoseconds) are increasingly used. Apart from their use in scientific fields, such short pulse laser arrangements increasingly are utilized also e.g. for the processing of materials with the highest precision, in ultrarapid spectroscopy, in the optical broadband communication and in femtochemistry. The laser crystals employed in such short pulse laser arrangements, cf. e.g. WO 98/10494 A; have excellent thermal properties as well as broad fluorescence bands so as to enable the generation of laser pulses having pulse durations of less than 10 or even less than 5 femtoseconds. Here, in particular, laser crystals are used which are doped with transition metals, such as, particularly, the titan sapphire (TI:S) laser crystal.

One problem in the generation of such ultra-short laser pulses resides in the remaining optical components of the respective laser system, wherein it would be particularly important to have wide-band dispersive components available.

It has already been suggested to provide dispersive mirrors for laser arrangements in thin-layer technique, cf., e.g., U.S. Pat. No. 5,734,503 A. In doing so, the mirrors are comprised of a plurality of individual layers having different properties, i.e. having respectively alternating higher and lower refraction indices, which, when reflecting an ultra-short laser pulse—which has a correspondingly large bandwidth in the frequency range fulfill their function: the different wave length components of the laser beam enter to different depths into the individual layers of the mirror before being reflected. In this manner, the different frequency components are delayed for different amounts of time, corresponding to the respective depth of entry; if a negative group delay dispersion must be attained, the shortwave wave packs will be reflected more outwardly; the long-wave components, however, will enter more deeply into the mirror before they are reflected. This means that the long-wave frequency components will be temporally delayed relative to the short-wave components. In this manner, a dispersion compensation can be attained for a short-pulse laser beam in a laser arrangement. Pulses of a particularly short time range have a wide frequency spectrum, with the different frequency components of the laser beam, primarily in a dense propagation medium (such as, e.g., in a laser crystal), or also in air, however, "seeing" a different refraction index (i.e., the optical thickness of the propagation medium is differently large for the different frequency components of the laser pulses); the different frequency components of the laser pulse therefore will be differently delayed when passing through the propagation medium. This effect is to be counteracted by the above-mentioned dispersion compensation at the known dispersive thin film laser mirrors, at which a negative group delay dispersion (GDD) is effected. These known mirrors are also termed "chirped mirrors" (CM), and constitute a substantial progress as compared to the previously used delaying elements comprising prisms. It has been possible for the first time to obtain laser pulses having pulse durations of 10 femtoseconds and below directly from a laser oscillator, and the laser systems have become more compact and reliable. The CM mirrors control the wave length dependence of the group delay as mentioned by the depth of entry of the various spectral components in the multilayer structure.

One problem with these CM mirrors and, quite generally, with comparable multilayer mirrors consists in that a reflection which is largely independent of the wave length (e.g. in the order of 3%) will occur at the interface between the uppermost layer and the environment, i.e. on the front face, where the radiation will impinge. As a consequence, interferences between beams reflected at this front face, and beams reflected more deeply in the multilayer structure of the mirror will occur, these interference effects possibly causing a distortion of the reflectivity and, above all, to a pronounced distortion of the phase characteristic of the mirror. To counteract this effect at least partially, it has already been suggested (cf. F. X. Kärntner, N. Matuscheck, T. Tschibili, U. Keller, H. A. Haus, C. Heine, R. Morf, V. Scheuer, M. Tilsch, T. Tschudi, "Design and fabrication of double-chirped mirrors", 1997, Opt. Lett 22, 831; and G. Tempea, F. Krausz, Ch. Spielmann, K. Ferencz, "Dispersion control over 150 THz with chirped dielectric mirrors" 1998, IEEE JSTQE 4, 193, respectively), to provide an anti-reflecting coating or a narrow-band barrier filter at the front face, i.e. at the interface with the environment (air, as a rule). To effectively suppress interfering resonances, the reflection at the front face should be in the order of merely $10^{-4}$. Antireflection layers and barrier filters may, however, approximate such a property merely over a very limited band width. Accordingly, in the past, with 800 nm radiation, dispersive mirrors could only be operated over band widths of 150–160 THz. Moreover, a complete suppression of the resonance interference effects is not even possible over such a band width, and the dispersion curve often exhibits pronounced fluctuations.

SUMMARY OF THE INVENTION

Therefore, it is an object of the invention to remedy this situation and to provide a multilayer mirror of the initially defined type, in which the interference effects mentioned which occur as a consequence of radiation reflected at the front side of the mirror are avoided in a simple manner.

The inventive multilayer mirror of the initially defined type is characterised in that the front face is inclined relative to the interfaces between the individual layers. By this inclined positioning of the front face of the multilayer structure of the mirror, i.e, for instance, the most forward interface of the mirror, e.g. between dielectric (mirror) and air (environment), it is achieved that the beam reflected on this front face is not co-linear with the beam components reflected at the remaining interfaces of the mirror multilayer structure, i.e. its axis extends under a corresponding angle relative to the axis of the remaining beam components; thus, a beam overlap, or an interference, respectively, will no longer occur (at a respective distance from the mirror, also dependent on the beam diameter), so that the previously described disturbing interference effects will be avoided and, e.g., a wide-band dispersion compensation will be possible.

The angle by which the front face is "tilted" relative to the remaining interfaces of the mirror-multilayer structure as such can be chosen within relatively wide limits, yet, as a rule, it will be kept as small as possible and be, e.g., in a range of from 1° or a few degrees only. On the one hand, such small angles are easy to realize during the production of the mirror, and, on the other hand, at a diameter of the incoming beam of, e.g., 2 mm, the reflected useful bundle beam, which is reflected by the inner interfaces of the multilayer structure, will be completely separated from the beam that is inclinedly reflected at the inclined front face after a propagation length of close to 6 cm, i.e. phase-disturbing interference effects (which here define the lower limit for the angle) can no longer occur, starting from this distance. Small angles (in a range of 10 or a few degrees only), moreover, have the advantage that the thickness of the first, outermost layer of the mirror—whose outer face forms the inclined front face—can also be kept slight, which is advantageous because then the positive dispersion of the $2^{nd}$ order which will be introduced by the wedge-shaped first, outer layer can be minimized (so as to optionally attain a negative total dispersion of the mirror).

However, in certain cases it may be desired to provide a larger "wedge" angle for the outer layer, e.g. so as to introduce an additional negative dispersion—similarly as in an arrangement comprising a prism pair.

Depending on its use, the construction of the multilayer mirror may be provided with a certain substrate and the thin-film individual layers of appropriate number and of the respective materials deposited thereon. In doing so, it is frequently possible and advantageous for a simple way of achieving the wedge shape of the outermost layer of the mirror, if the inclined front face is provided by the outer face of a wedge-shaped transparent substrate, on the rear side of which the layers are applied. In this embodiment, thus, a pre-fabricated, thin transparent wedge-shaped glass substrate is used on the rear side of which, facing away from the front face, the desired thin-film layers will be applied in a per se conventional manner; e.g., alternating layers of relatively low refraction index and other ones having a relatively high refraction index will be applied. In operation, the incoming beam at first will arrive on the wedge-shaped glass substrate, with the beam reflected at the inclined front face being reflected back under an inclination, and, moreover, the desired described reflections in the interior of the mirror will occur, depending on the wavelength of the beam components, wherein the reflected beam components will not interfere with the beam that is inclinedly reflected on the outer side, at the front face.

In this embodiment, however, it has been shown that the wedge-shaped substrate which is thin may become wavy due to the tensions forming in the coating; by this, the surface quality will be impaired. A different, particularly advantageous possibility for achieving the inclined front face or outer face of the multilayer mirror thus consists in that the inclined front face is provided by the outer face of an outer layer of linearly changing thickness, which, together with the other individual layers is applied to a substrate facing away from the beam impacting side. In this mirror construction, thus, the substrate which may be plane-parallel and thick, will form the rear side of the mirror, and on this substrate the individual layers will be applied in a per se conventional manner. To achieve an outer layer having wedge-shape, i.e. to provide the linearly changing thickness of the layer, the substrate may be somewhat inclinedly positioned in the coating chamber during the production of this layer in the form of a thin-film layer, or a mask of appropriately linearly varying permeability may be used when applying the material for the outermost layer. In both instances, the already previously obtained structure is subjected to an inhomogenous vapor flow for producing the outer layer, wherein the thickness of the outermost (uppermost) layer will monotonously decrease with an increasing distance from the vapour source.

Another advantageous embodiment which is simple to produce is characterised in that the outer layer is formed by a wedge-shaped glass platelet. To avoid reflections at the interface coating/glass platelet, the glass platelet can be applied to the coating via an index-adapting fluid, an optical glue or an optical cement.

As has already been indicated, the beam which is inclinedly reflected at the front face of the multilayer structure of the mirror, as such is a beam of a relatively low intensity, yet nevertheless it introduces a loss which will contribute to the mirror losses. To minimize the mirror losses, it is therefore advantageous if on the inclined front face, an anti-reflective coating is applied with an appropriately inclined front face. Anti-reflecting, in particular multilayer coatings are known per se, and also antireflecting coatings are known which do not introduce phase distortions. Tests have shown that the reflectivity at the inclined front face in this manner can be reduced to below 0.2% in the wavelength range of 500 to 1000 nm. For the sake of completeness it should be mentioned that this AR (antireflection) coating consists of layers extending under an inclination relative to the remaining interfaces in the interior of the mirror multilayer structure, corresponding to the inclined extension of the front face of the mirror proper. As the layers for the AR coating, e.g. $TiO_2$ layers and $SiO_2$ layers, or $Ta_2O_5$ and $SiO_2$ layers, respectively, may be used.

It has proven suitable if the thicknesses of the individual layers vary with the distance from the substrate so as to achieve a pre-determined reflection characteristic and/or a pre-determined group delay dispersion characteristic. By the indicated variation in the layer thickness, a certain set curve with respect to reflectivity, and dispersion (group delay dispersion), respectively, can be determined, depending on the purpose of use of the mirror, wherein, e.g., the introduction of a negative group delay dispersion is just as conceivable as the provision of a pre-determined positive group delay dispersion. In particular, it is advantageous if the thicknesses of the individual layers generally increase with the distance from the front face so as to provide a negative, optionally constant, group delay dispersion and a high reflectivity in a pre-determined spectral range.

The present multilayer dispersive mirror may have a chirped structure (cf. U.S. Pat. No. 5,734,503 A), in which the layer thicknesses on an average increase with the distance from the most forward layer, yet also a resonant structure may be provided, such as, e.g., is disclosed in the earlier AT application A 1160/99 which is no prior publication. For the construction of the multilayer structure of the present mirror, $SiO_2$ layers and $TiO_2$ layers may alternatingly be provided as individual layers in a manner known per se; with a view to a low-cost and reliable production it is, however, also conceivable that $SiO_2$ layers and $Ta_2O_5$ layers are alternatingly provided as the individual layers. Such a layer structure comprising $Ta_2O_5$ layers is also advantageous because the absorption edge of $Ta_2O_5$ lies at relatively short wavelengths, whereby the destruction threshold of the material is a higher one.

Another advantageous embodiment of the present mirror is obtained if semiconductor layers having a lower refraction index and semiconductor layers having a higher refraction index are alternatingly provided as individual layers. One advantage of such a semiconductor embodiment consists in that it will be possible to insert saturatable absorber layers known per se in the multilayer structure of the mirror, which may be particularly advantageous for its use in laser devices.

The mirror according to the invention will be particularly advantageously used in a laser device, in particular in a short-pulse laser device, in particular as an element for dispersion control, as has been explained in the beginning.

BRIEF DESCRIPTION OF THE DRAWINGS

In the following, the invention will be explained in more detail by way of particularly preferred exemplary embodiments to which, however, it shall not be restricted, and with reference to the accompanying drawings. In detail, in the drawings, FIG. 1 schematically shows the structure of a dispersive multilayer mirror comprising a wedge-shaped forward glass substrate.

DETAILED DESCRIPTION OF THE INVENTION

Figure 1:
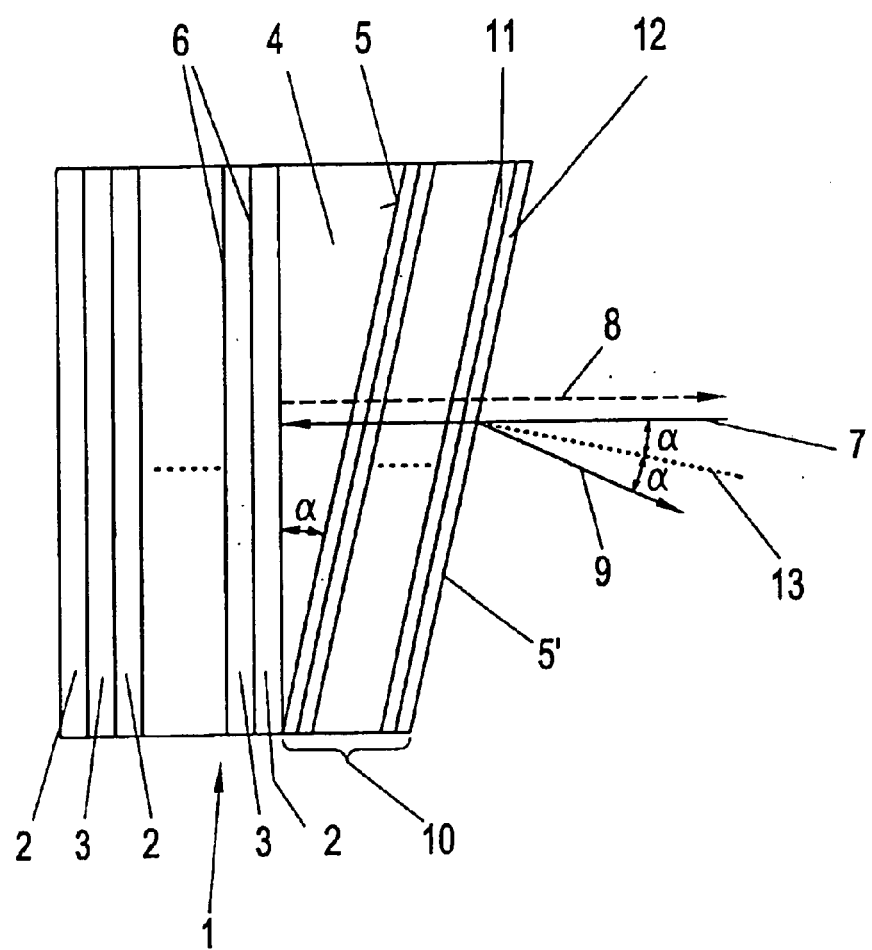

In FIG. 1, a multilayer dispersive mirror 1 is schematically illustrated which, e.g., is assembled of individual layers 2 having a relatively low refraction index and individual layers 3 of relatively high refraction index. These individual layers 2, 3 are alternatingly arranged, a total of e.g. 30 individual layers 2, 3 or more possibly being provided. These individual layers 2, 3 are applied to the rear side of a wedge-shaped thin transparent substrate 4, in particular a glass substrate, in a per se conventional manner, e.g. by vapour deposition. As is visible, substrate 4 is wedge-shaped, i.e. its thickness changes linearly from one side of minimum thickness towards the other, opposite side of maximum thickness so that in this manner a front face 5 is obtained which, compared to the interfaces 6 between the individual layers 2, 3, extends inclined under an angle α.

A beam 7, in particular a laser beam, arriving at the front face 5 will penetrate through substrate 4 and, depending on the wavelengths of its individual frequency components, will be reflected more or less deeply in the multilayer structure 2, 3 of mirror 1 at the respective interfaces 6 to thus attain the initially described dispersion control for the reflected beam 8. As a rule, here a negative group delay dispersion GDD will be provided, wherein waves of longer wavelengths will penetrate more deeply into the multilayer structure 2, 3 for the purpose of a longer delay than short-wave components which will be reflected more outwardly in mirror 1.

As has been shown, at the front face of mirror 1, an—even though slight, yet—without inclined front face—detrimental reflection will normally occur, the beam reflected here causing interferences with the beams reflected within the multilayer structure 2, 3 of the mirror 1, which interferences result in pronounced distortions of the reflectivity and of the phase characteristic of the mirror. To avoid these interference effects, the front face 5 is arranged under an inclination relative to the remaining interfaces 6, as has been mentioned, so that the beam 9 reflected at the front side 5 or 51, respectively, of mirror 1 will be reflected under an angle equalling twice the angle of inclination α of the front face 5 or 51, respectively. In this way, this inclinedly reflected beam 9 will not be an interfering factor any longer at least at a relatively short distance, since, depending on the angle of inclination of the front face 5 or 5', respectively, as well as depending on the diameter of the incoming beam 7, it will be completely separated from the useful beams 7 and 8 already at a relatively short length of propagation, in the range of a few centimeters, so that, starting from this distance, phase-disturbing interference effects can no longer occur.

Since the inclinedly reflected beam 9 contributes to the losses of mirror 1, an anti-reflecting (AR-antiflection) coating 10 is applied, preferably to the front face 5 of the wedge-shaped layer 4—which here forms the substrate for layers 2, 3—which anti-freflecting layer is applied of several individual layers 11, 12 of alternatingly less refractive layers 11 or more highly refractive layers 12. For this AR coating, $TiO_2$ and $SiO_2$ layers, or $Ta_2O_5$ and $SiO_2$ layers, e.g., may alternatingly be used in a per se conventional manner, wherein, as a rule, less than 15 layers will suffice and due to this AR coating 10 no phase distortions will be introduced. With such an AR coating 10 it is possible to lower the reflectivity at the now outer front face 5' (interface of mirror 1 to the environment) in the wave length range of interest of from 500 nm to 1000 nm to below 0.2%.

For the sake of completeness, in FIG. 1 furthermore the surface normal 13 is illustrated which is perpendicular to the front face 51 and forms the bisecting line of the angle between the incoming beam 7 and beam 9 which is inclinedly reflected on the front face 5'.

For constructing a mirror 1 according to FIG. 1, the following layer structure may, e.g., be chosen:

| Material wedge-shaped substrate 4 | Layer thickness (nm) |
| --- | --- |
| $SiO_2$ | 259.80 |
| $TiO_2$ | 15.00 |
| $SiO_2$ | 61.38 |
| $TiO_2$ | 59.12 |
| $SiO_2$ | 18.81 |
| $TiO_2$ | 79.30 |
| $SiO_2$ | 72.89 |
| $TiO_2$ | 21.16 |
| $SiO_2$ | 118.24 |
| $TiO_2$ | 56.13 |
| $SiO_2$ | 30.30 |
| $TiO_2$ | 75.66 |
| $SiO_2$ | 96.41 |
| $TiO_2$ | 33.40 |
| $SiO_2$ | 76.25 |
| $TiO_2$ | 76.31 |
| $SiO_2$ | 80.31 |
| $TiO_2$ | 35.10 |
| $SiO_2$ | 108.49 |
| $TiO_2$ | 73.01 |

-continued

| Material wedge-shaped substrate 4 | Layer thickness (nm) |
|---|---|
| SiO$_2$ | 72.73 |
| TiO$_2$ | 48.58 |
| SiO$_2$ | 102.70 |
| TiO$_2$ | 76.02 |
| SiO$_2$ | 95.01 |
| TiO$_2$ | 42.53 |
| SiO$_2$ | 100.45 |
| TiO$_2$ | 97.86 |
| SiO$_2$ | 100.47 |
| TiO$_2$ | 50.81 |
| SiO$_2$ | 93.09 |
| TiO$_2$ | 82.43 |
| SiO$_2$ | 132.75 |
| TiO$_2$ | 76.17 |
| SiO$_2$ | 84.22 |
| TiO$_2$ | 69.18 |
| SiO$_2$ | 148.68 |
| TiO$_2$ | 78.55 |
| SiO$_2$ | 117.82 |
| TiO$_2$ | 79.60 |
| SiO$_2$ | 154.27 |
| TiO$_2$ | 78.25 |
| SiO$_2$ | 116.50 |
| TiO$_2$ | 109.89 |
| SiO$_2$ | 143.51 |
| TiO$_2$ | 89.85 |
| SiO$_2$ | 158.38 |
| TiO$_2$ | 76.01 |
| SiO$_2$ | 174.52 |
| TiO$_2$ | 86.94 |
| SiO$_2$ | 186.03 |
| TiO$_2$ | 96.81 |
| SiO$_2$ | 167.78 |
| TiO$_2$ | 106.09 |
| SiO$_2$ | 191.54 |
| TiO$_2$ | 120.83 |
| SiO$_2$ | 187.05 |
| TiO$_2$ | 122.09 |
| SiO$_2$ | 307.80 |

Figure 4:
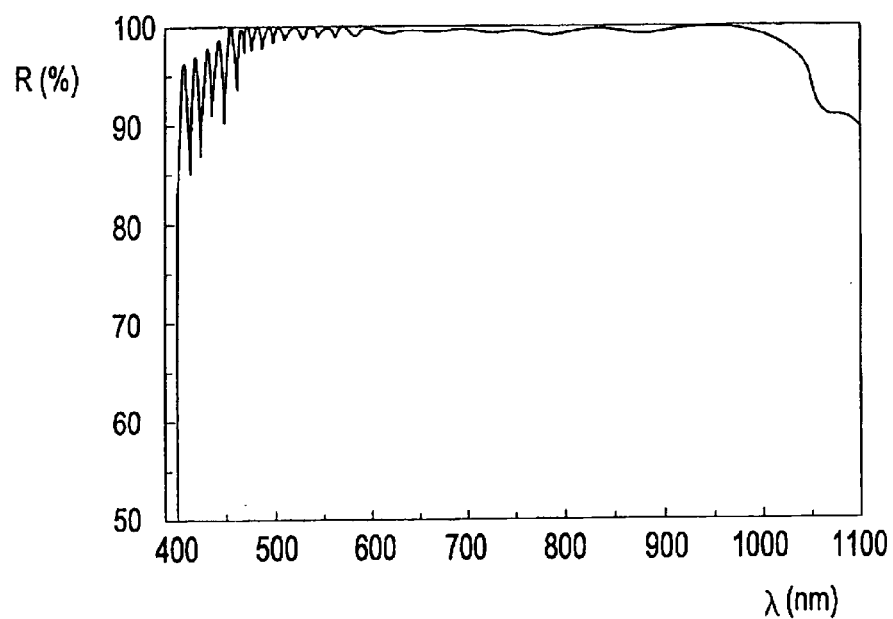
FIG. 4 shows the reflectivity R of a mirror according to FIG. 1 or FIG. 2 in dependence on the wavelength λ in a diagram.
Figure 5:
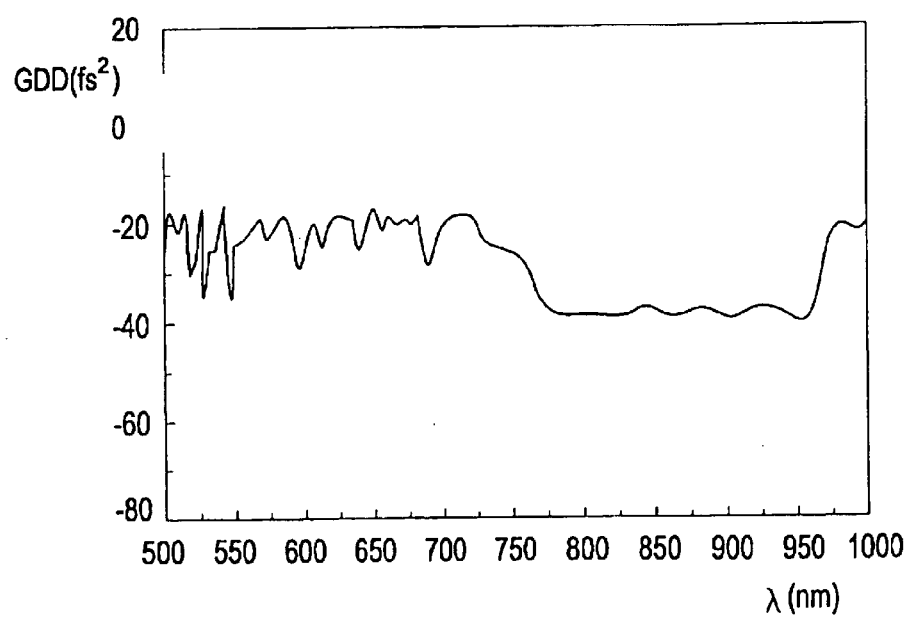
FIG. 5 shows the group delay dispersion GDD of the mirror according to FIG. 1 or 2 over the wavelength λ in a diagram.

For such a mirror, the reflectivity R (in %) over the wavelength λ (in nm) and the group delay dispersion GDD (in fs$^2$), respectively, over the wavelength λ (in nm) is illustrated in FIGS. 4 and 5. As can be seen from FIG. 4, the reflectivity R is practically constant in the wavelength range from 500 nm to 1000 nm, and the group delay dispersion GDD shown in FIG. 5 exhibits a slightly wavy course.

Figure 2:
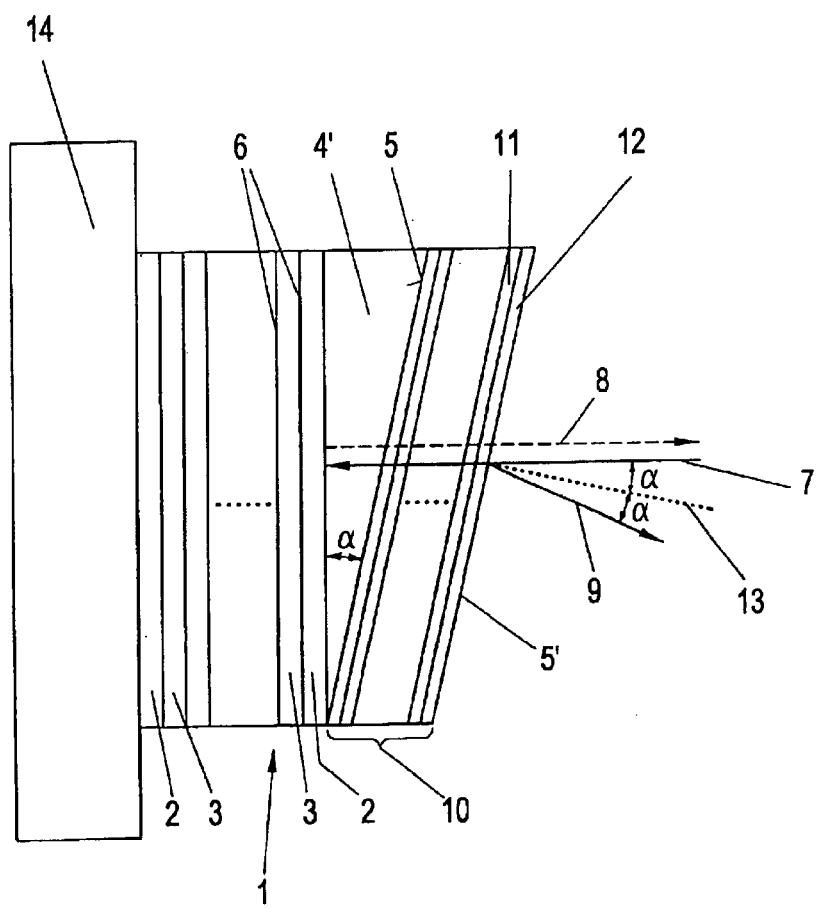
FIG. 2 shows a different multilayer dispersive mirror in a corresponding schematic view, in which a rearward substrate to be chosen depending on the purpose of use is provided as a base for the layer construction.

In FIG. 2, a different embodiment of a multilayer dispersive mirror 1 is shown, wherein here again alternating individual mirror layers 2, 3 having a higher, or lower refraction index, respectively, are applied in a conventional manner on a rear-side substrate 14. A wedge-shaped outer layer 4' forms the most forward mirror layer, the layer thickness thereof increasing linearly, corresponding to the angle α, so that its front face 5 again extends inclined by angle α relative to the interfaces 6 between the remaining individual mirror layers 2, 3. Here, too, an AR coating 10 is applied to the front face 5 of the outer layer 4', which AR coating 10 is made up of alternating respective layers 11 and 12, of lower or higher refraction indices, respectively. Thereby, again, the intensity of the undesired beam 9 reflected at the front face 5' of AR coating 10 is kept extremely low so that the mirror losses will be minimized.

The wedge-shaped outer layer 41 may, e.g., be prepared in that the substrate 14 with the individual layers 2, 3 already applied thereto being tilted in the coating chamber according to the desired inclined position, whereby, on account of the fact that the substrate thus de facto will be subjected to a non-homogenous flow of vapour, the thickness of layer 41 will linearly decrease with an increasing distance from the vapour source. Another possible way consists in using a correspondingly inhomogenous mask during the deposition of the material for layer 41 from the vapour phase, whereby also a linearly varying layer thickness will be obtained for layer 4'.

Figure 6:
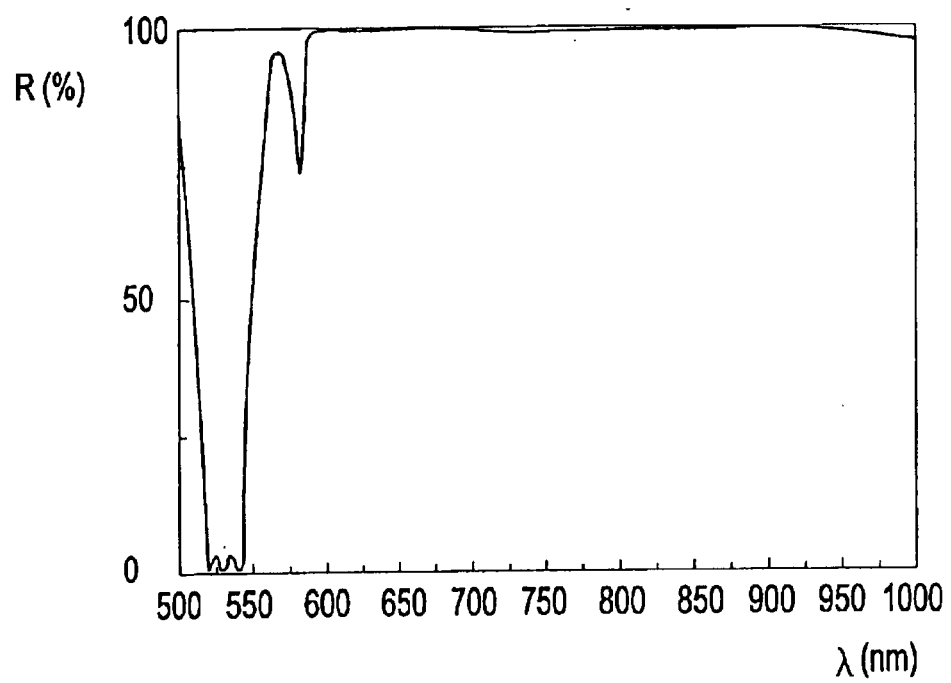
FIGS. 6 and 7 show the reflectivity R (FIG. 6), and the group delay dispersion GDD (FIG. 7), respectively, over the wavelength λ for another mirror according to FIG. 1 or 2 in respective diagrams, which mirror can be used as a coupling-in mirror in the laser resonator on account of its high transmission in the range of the pump wavelength.
Figure 7:
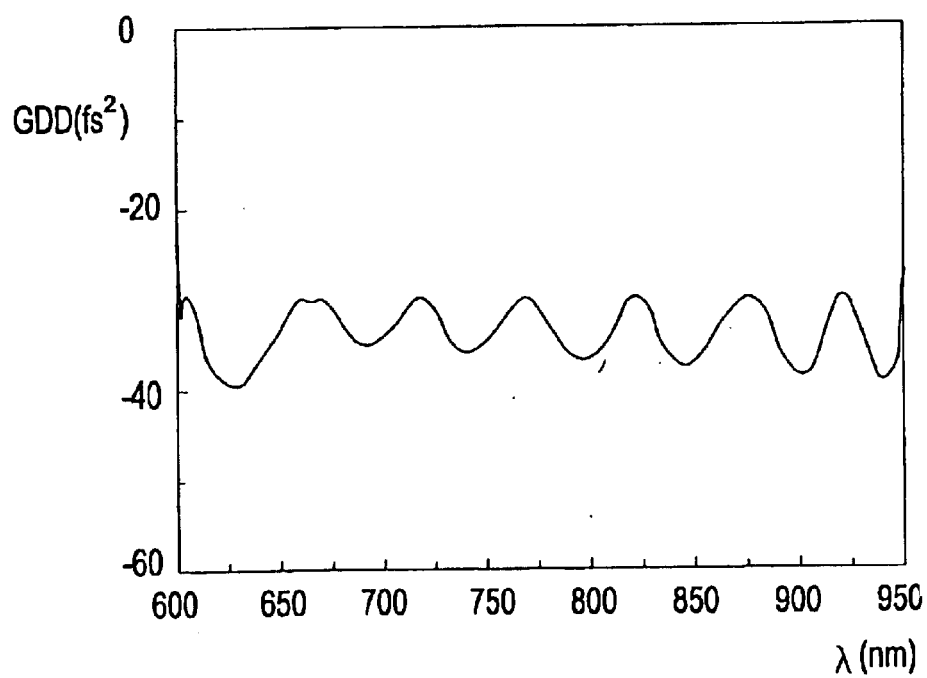

In FIGS. 6 and 7, diagrams associated to the mirror 1 according to FIG. 2 and relating to the reflectivity R over the wavelength λ (FIG. 6) and to the group delay dispersion GDD over the wavelength λ (FIG. 7) are shown, wherein the constancy of the reflectivity R in the wavelength range from approximately 580 nm to 950 nm, a slightly wavy course of the group delay dispersion GDD between approximately −30 fs$^2$ and −38 fs$^2$ in the range of 600 nm to 950 nm as well as a high transmissivity in the vicinity of the pump beam wavelength (at 520 nm to 540 nm) can be seen.

Figure 8:
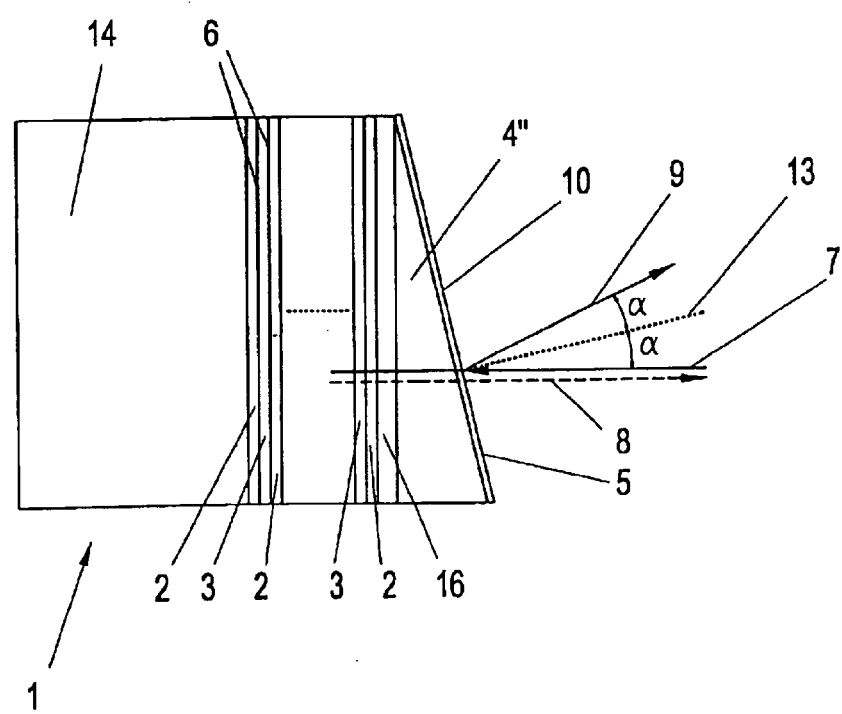
FIG. 8 shows a particularly preferred embodiment of a dispersive mirror which is designed similar to that of FIG. 2 with a rearward substrate.

In FIG. 8, an embodiment of a multilayer dispersive mirror 1 which is modified relative to FIG. 2 is shown, in which again the multilayer structure 2, 3 for the dispersion compensation is applied to the rear-side optical substrate 14 which is thick and plane-parallel. At the front side of this multilayer structure 2, 3, a wedge-shaped glass platelet 4n is applied as the outer layer, which thus again defines an inclined front face 5 relative to an arriving beam 7. The reflective useful beam again is denoted by 8, and the undesired beam 9 reflected at the front face 5 which is directed away under an inclination so as to avoid interferences with the useful beam, as described before, is indicated at 9. The wedge-shaped glass platelet 4" may be provided with an AR coating 10 at its front face 5, as described in the previous embodiments.

To avoid reflectivity at the interface of the multilayer structure 2, 3/wedges-shaped glass platelet 4", an index adapting layer 16 may be provided via which the wedge-shaped glass platelet 4" is connected with the multilayer structure 2, 3, i.e. with the most forward individual layer 2 or 3 thereof. In detail, an index adapting fluid may be used, or the glass platelet 4" is fastened with the assistance of an optical glue or an optical cement. Examples of materials are: aliphatic and alicyclic carbohydrates of various concentrations as index-adapting fluids, or clear epoxy resins as optical cements or polymerisable monomeric optical glues (cf. also U.S. Pat. No. 5,045,397 A).

Depending on the respective use, the individual layers 2, 3 of multilayer mirror 1 may have varying thicknesses, depending on their distance from the outer layer 4' (FIG. 2, or 8, respectively), or from the substrate 4 (FIG. 1), respectively, in particular layer thicknesses which generally increase on an average with this distance so as to attain a negative group delay dispersion GDD and a high reflectivity R, respectively, in a certain spectral range.

Mirror 1 may be a so-called chirped mirror (CM), yet it may also be a resonant layer structure. The individual layers 2, 3 may, moreover, also be per se conventional semiconductor layers to thus incorporate saturatable absorber layers in the mirror structure.

Figure 3:
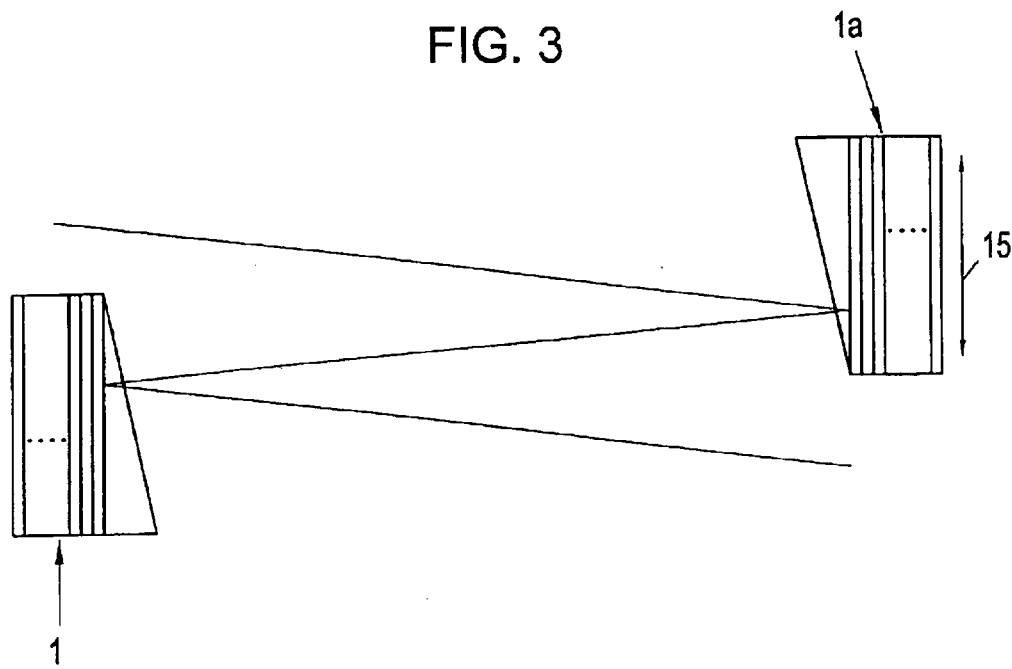
FIG. 3 shows an arrangement with two dispersive mirrors, e.g. according to FIG. 1 (or also according to FIG. 2) for the compensation of a spacial dispersion (angular dispersion)

To avoid, or compensate for, respectively, a spacial (angular) dispersion, it is suitable to use mirrors 1 having an inclined front face 5, or 5', respectively, as described here, in pairs, as can be seen from FIG. 3. In this manner, the angular dispersion introduced by a mirror 1 can be compensated by the other mirror, e.g. 1a in FIG. 3. Moreover, such an arrangement of mirror pairs 1, 1a allows for an exact tuning of the entire dispersion, wherein one of the mirrors, e.g. mirror 1a, is displaced in transverse direction, as schematically illustrated by arrow 15 in FIG. 3.

By the above-described inclined position of the front face 5, or 5', respectively, of the present multilayer mirror 1, the impedance maladjustment at the outermost interface (front face 5, or 5', respectively) is avoided, and the permeability below the high reflection band of the mirror is substantially improved, since interference bands of higher order are partially suppressed. Accordingly, the present mirror 1 with its inclined front face 5, or 51, respectively, can have a high reflectivity R and a constant group delay dispersion GDD in the wavelength range from 600 nm to 950 nm as well as a high permeability in the vicinity of the common pump beam wavelength (520 nm to 540 nm), as is apparent from FIGS. 4 to 7. The transmission of a Bragg mirror at the pump beam wavelength can also be increased by inclinedly positioning the most forward interface 6 relative to the remaining interfaces 6 of the layer structure. As regards deviations from the nominal thickness of layers 2, 3, 4, 4', 4", in particular the outer layers 4, or 4', or 4", respectively, the present mirror 1 is not as sensitive as conventional chirped mirrors, in which already relatively slight production errors can cause pronounced fluctuations, particularly in the GDD curve.

The higher stability of the present mirror 1 is attained by the fact that the impedance adaptation between the multi-layer structure proper and the uppermost wedge-shaped layer 4, or 4', or 4", respectively, is achieved independently of the layer structure. Statistical tests have shown that in a conventional chirped mirror which introduces a group delay dispersion of −45 fs, in the range of 300 nm at 800 nm, fluctuations in the GDD characteristic line with a maximum amplitude of 100% of the target value (at 800 nm) are the consequence at an average deviation of 0.5 nm from the nominal layer thickness. Under equal conditions, in a mirror having an inclined front face 5, or 5', respectively, the maximum amplitude of the GDD fluctuations at 800 nm is merely 30%.

What is claimed is:

1. A multilayer mirror for introducing a pre-determined group delay dispersion, said mirror comprising several individual mirror layers of different optical properties and thicknesses applied to a substrate and following each other via parallel, plane interfaces, and a plane front face on the side of beam impact, said front face being inclined relative to the interfaces between the individual mirror layers, wherein the inclined front face is provided by an outer face of an outer layer of linearly changing thickness which is deposited onto the substrate, which outer layer together with the other individual mirror layers is applied to the substrate which is positioned on the side of the mirror opposite to the beam impacting side.

2. A mirror according to claim 1, wherein an anti-reflecting coating having an appropriately inclined front face is applied to the inclined front face.

3. A mirror according to claim 1, wherein $SiO_2$ layers and $TiO_2$ layers are alternatingly provided as the individual mirror layers.

4. A mirror according to claim 1, wherein $SiO_2$ layers and $Ta_2O_5$ layers are alternatingly provided as the individual mirror layers.

5. A mirror according to claim 1, wherein semiconductor layers having a lower refraction index and semiconductor layers having a higher refraction index are alternatingly provided as the individual mirror layers.

6. A mirror according to claim 1, wherein the thicknesses of with the distance from the substrate so as to attain a pre-determined reflection characteristic and/or a pre-determined group delay dispersion.

7. A mirror according to claim 1, wherein the thicknesses of the individual mirror layers increase with the distance from the front face in general so as to provide a negative, optionally constant, group delay dispersion and a high reflectivity in a pre-determined spectral range.

* * * * *